United States Patent
Stephens et al.

(10) Patent No.: US 7,567,612 B2
(45) Date of Patent: Jul. 28, 2009

(54) SDMA COMMUNICATIONS WITH NON-IMMEDIATE BLOCK ACKNOWLEDGMENT

(75) Inventors: Adrian P. Stephens, Cambridge (GB); Qinghua Li, Sunnyvale, CA (US); Xintian E. Lin, Palo Alto, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/923,631

(22) Filed: Oct. 24, 2007

(65) Prior Publication Data

US 2008/0181162 A1    Jul. 31, 2008

Related U.S. Application Data

(63) Continuation of application No. 10/737,639, filed on Dec. 15, 2003, now abandoned.

(60) Provisional application No. 60/493,937, filed on Aug. 8, 2003.

(51) Int. Cl.
  *H04B 1/38*   (2006.01)
  *H04L 12/42*  (2006.01)
(52) U.S. Cl. .................... 375/219; 370/449
(58) Field of Classification Search ............. 375/219, 375/220, 267; 710/105, 106; 709/237; 370/346, 370/449, 452, 476
See application file for complete search history.

(56) References Cited

U.S. PATENT DOCUMENTS

| 5,528,605 | A | 6/1996 | Ywoskus et al. |
| 6,215,764 | B1* | 4/2001 | Wey et al. .................... 370/216 |
| 6,779,046 | B1* | 8/2004 | Osuga ......................... 710/14 |
| 7,023,876 | B2 | 4/2006 | Berry et al. |
| 2004/0002357 | A1 | 1/2004 | Benveniste |

FOREIGN PATENT DOCUMENTS

| WO | 00/33502 A1 | 6/2000 |
| WO | 0241647 A2 | 5/2002 |

OTHER PUBLICATIONS

"Operation of HDLC ABM In Harsh Error Environments: A Robust Extension", (Fairhurst), published in Communication, Speech and Vision, IEEE Proceeding I, vol. 138 Issue 4 pp. 291-298, Aug. 1991.

\* cited by examiner

*Primary Examiner*—Khai Tran
(74) *Attorney, Agent, or Firm*—John F. Travis

(57) ABSTRACT

In Spatial Division Multiple Access (SDMA) communications, mobile devices that are transmitting to a base substantially simultaneously during a predetermined communications phase may wait until after an end of the predetermined communications phase to receive acknowledgments to their transmissions, so that a mobile device making a relatively short transmission does not experience an acknowledgement timeout while another mobile device is still completing a relatively long transmission. In some embodiments, the mobile devices may transmit a non-immediate block acknowledgement request during the communications phase.

13 Claims, 7 Drawing Sheets

SDMA COMMUNICATIONS WITH NON-IMMEDIATE BLOCK ACKNOWLEDGMENT

RELATED APPLICATIONS

This application is a continuation of U.S. patent application Ser. No. 10/737,639, filed Dec. 15, 2003, which claims priority to U.S. provisional application 60/493,937, filed Aug. 8, 2003. This application claims priority to those filing dates.

BACKGROUND

To address the problem of ever-increasing bandwidth requirements that are placed on wireless data communications systems, various techniques are being developed to allow multiple devices to communicate with a single base station by sharing a single channel. In one such technique, a base station may transmit or receive separate signals to or from multiple mobile devices at the same time on the same frequency, provided the mobile devices are located in sufficiently different directions from the base station. For transmission from the base station, different signals may be simultaneously transmitted from each of separate spaced-apart antennas so that the combined transmissions are directional, i.e., the signal intended for each mobile device may be relatively strong in the direction of that mobile device and relatively weak in other directions. In a similar manner, the base station may receive the combined signals from multiple independent mobile devices at the same time on the same frequency through each of separate spaced-apart antennas, and separate the combined received signals from the multiple antennas into the separate signals from each mobile device through appropriate signal processing so that the reception is directional.

Under currently developing specifications, such as IEEE 802.11 (IEEE is the acronym for the Institute of Electrical and Electronic Engineers, 3 Park Avenue, 17th floor, New York, N.Y.), each mobile device may transmit a data block of variable length, and then wait for a predetermined timeout period after the data block for an acknowledgment from the base station to signify that the base station received the data block. If the base station transmits and receives on the same frequency, that fact may preclude the base station from transmitting and receiving at the same time, so that the base station waits until all incoming data blocks are complete before sending out any acknowledgments. However, since the data blocks are of variable length, a mobile device sending a short data block may experience an acknowledgment timeout while the base station is still receiving a long data block from another mobile device. The resulting unnecessary retransmission of the short data block may cause inefficiencies in the overall data communications, and under some circumstances may even result in a service interruption.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

Figure 1:
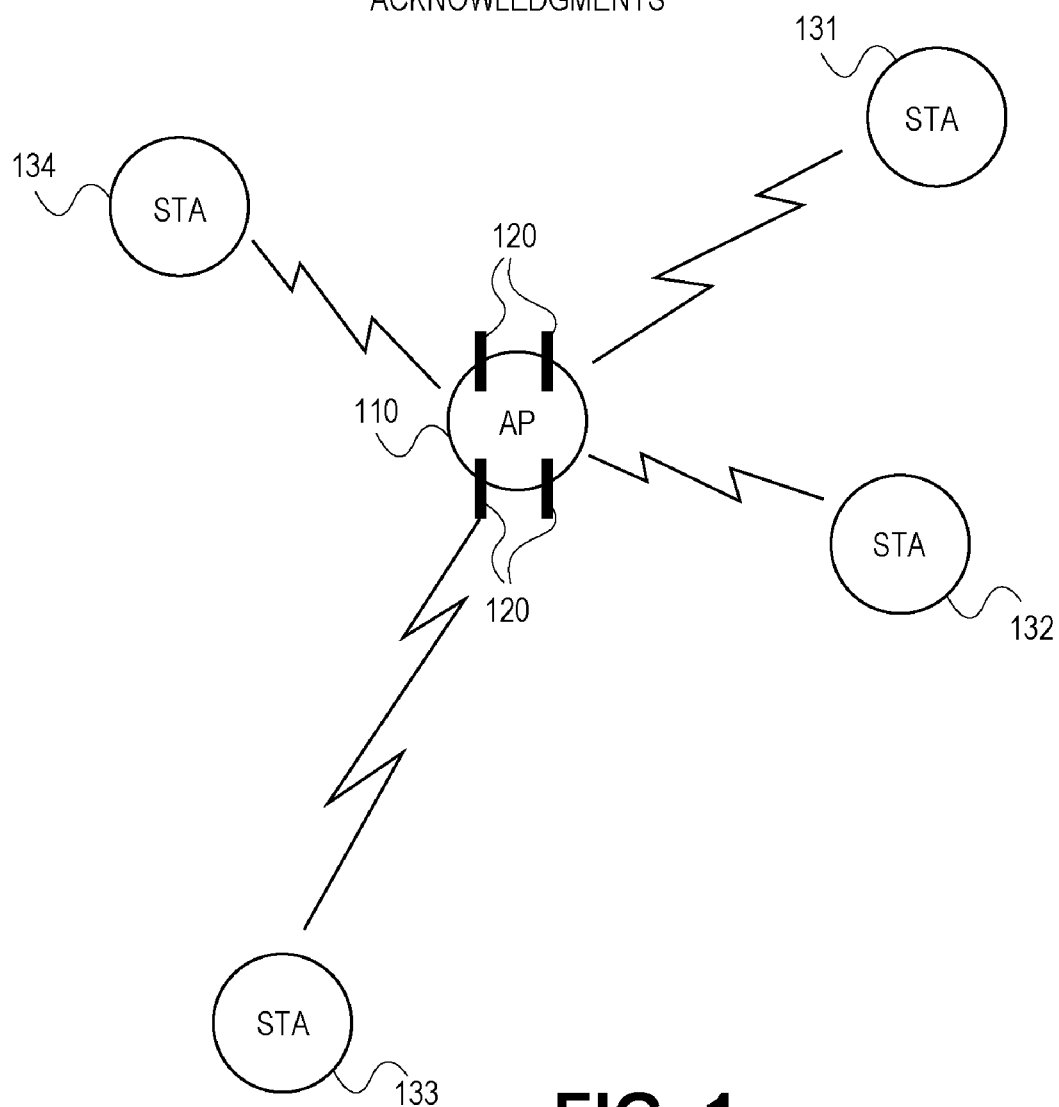
FIG. 1 shows a diagram of a communications network, according to an embodiment of the invention.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

In keeping with common industry terminology, the terms "base station", "access point", and "AP" may be used interchangeably herein to describe an electronic device that may communicate wirelessly and substantially simultaneously with multiple other electronic devices, while the terms "mobile device" and "STA" may be used interchangeably to describe any of those multiple other electronic devices, which may have the capability to be moved and still communicate, though movement is not a requirement. However, the scope of the invention is not limited to devices that are labeled with those terms. Similarly, the terms "spatial division multiple access" and SDMA may be used interchangeably. As used herein, these terms are intended to encompass any communication technique in which different signals may be transmitted by a combination of antennas substantially simultaneously from the same device such that the combined transmitted signals result in different signals intended for different devices being transmitted substantially in different directions on the same frequency, and/or techniques in which different signals may be received substantially simultaneously through multiple antennas on the same frequency from different devices in different directions and the different signals may be separated from each other through suitable processing. The term "same frequency", as used herein, may include slight variations in the exact frequency due to such things as bandwidth tolerance, Doppler shift adaptations, parameter drift, etc. Two or more transmissions to different devices are considered substantially simultaneous if at least a portion of each transmission to the different devices occurs at the same time, but does not imply that the different transmissions must start and/or end at the same time, although they may. Similarly, two or more receptions from different devices are considered substantially simultaneous if at least a portion of each reception from the different devices occurs at the same time, but does not imply that the different transmissions must start and/or end at the same time, although they may. Variations of the words represented by the term SDMA may sometimes be used by others, such as but not limited to substituting "space" for "spatial", or "diversity" for "division". The scope of various embodiments of the invention is intended to encompass such differences in nomenclature.

Some embodiments of the invention may comprise the transmission of a data burst from a mobile device to a base station, in which the data burst includes a request for a non-immediate block acknowledgment from the base station. A data burst may comprise one block of data, or multiple sequential blocks (sub-bursts) of data. A non-immediate acknowledgment may be an acknowledgment that can be delayed until a later time rather than being sent within a predetermined time after the end of the data that is being acknowledged. A block acknowledgment may be a single acknowledgment that acknowledges multiple sub-bursts rather than requiring a separate acknowledgment for each of the multiple sub-bursts. In some embodiments, a block acknowledgment may identify each of the sub-bursts that is being acknowledged, so that some sub-bursts may be acknowledged while others are not, even thought a single block acknowledgment is being used. Thus, a non-immediate block acknowledgment may acknowledge all or individual ones of a group of sub-bursts, and may be delayed until an appropriate acknowledgment time without causing acknowledgement timeouts for the individual sub-bursts.

FIG. 1 shows a diagram of an SDMA communications network that may use non-immediate block acknowledgments in SDMA operations, according to an embodiment of the invention. The illustrated embodiment of a communications network shows an AP 110 that may communicate with multiple STAs 131-134 located in different directions from the AP. The AP 110 may transmit different signals to each of the STAs 131-134 substantially simultaneously, using SDMA techniques. Similarly, each STA 131-134 may transmit different signals to the AP 110 substantially simultaneously, and the AP 110 may separate the combined received signals into the individual signals from each STA using SDMA techniques. Non-immediate block acknowledgments may be used to avoid potential timeouts that could occur if each STA expected to receive an acknowledgment to its transmission within a predefined timeout period that started immediately after the conclusion of that transmission.

Although AP 110 is shown with four antennas 120 to communicate wirelessly with up to four STAs at a time using SDMA techniques, other embodiments may have other arrangements (e.g., AP 110 may have two, three, or more than four antennas). Each STA may have at least one antenna to communicate wirelessly with the AP 110. In some embodiments the STA antenna(s) may be adapted to operate omni-directionally, but in other embodiments the STA antenna(s) may be adapted to operate directionally. In some embodiments the STAs may be in fixed locations, but in other embodiments at least some of the STAs may be moving during and/or between communications sequences. In some embodiments the AP may be in a fixed location, but in other embodiments the AP may be moving during and/or between communications sequences.

Figure 2:
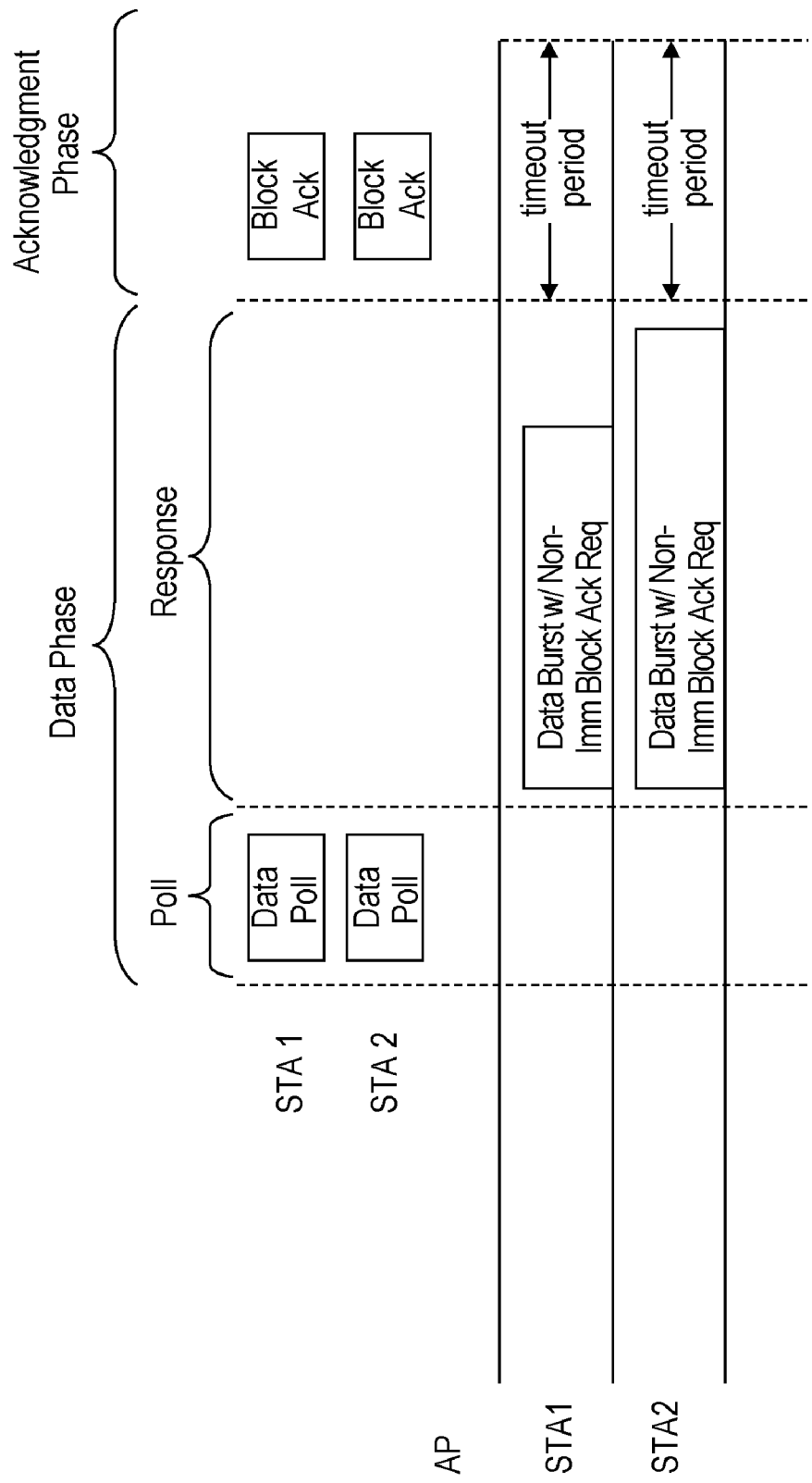
FIG. 2 shows a timing diagram of a communications sequence involving a base station and two mobile devices, according to an embodiment of the invention.

FIG. 2 shows a timing diagram of a communications sequence using non-immediate block acknowledgments, according to an embodiment of the invention. In FIG. 2, transmissions from a base station are on the line indicated as AP, while transmissions from two mobile devices are on the lines indicated as STA1 and STA2, respectively. The AP line is further sub-divided into spatial channels, labeled as STA 1 (directional transmissions from the base station to the mobile device STA1), STA 2 (directional transmissions from the base station to the mobile device STA2). Only two STAs are shown in FIG. 2, however, other embodiments may include any feasible number of STAs operating at the same time and following the sequence shown. FIG. 2 assumes that the AP is already enabled to communicate with multiple STAs at the same time using SDMA techniques, and any process that might have been used to create such enablement is not shown. FIG. 2 shows a data phase followed by an acknowledgment phase. During the data phase the AP may poll the STAs for data during the poll period, and the polled STAs may respond with data bursts to the AP during the response period, a data burst comprising one or more blocks of data transmitted in succession. During the acknowledgment phase the AP may send a separate acknowledgment to each STA from which data was correctly received. The AP may withhold an acknowledgment to any STA from which data was not correctly received. Any one or more of the data phase, acknowledgment phase, poll period, and response period may have predetermined durations that are known by the AP and/or STAs. In some embodiments the length of the data phase and/or response period may be specified in the poll.

As shown in FIG. 2, the relevant STA's (those in the same poll group) may each be polled at the same time during the poll period using a defined poll format. In some embodiments, the polls to the STAs may be transmitted substantially simultaneously using the directional capabilities of SDMA transmissions, but other embodiments may use other techniques.

During the response period, each STA that received a poll may respond by sending a data burst to the AP. In some embodiments, each data burst may consist of multiple sub-bursts, with each sub-burst conforming to the format of a medium access control protocol data unit (MPDU), although the scope of the invention is not limited in this respect. Because the SDMA format may not allow the AP to transmit and receive simultaneously, the AP may not transmit any acknowledgments to the data burst or any of the sub-bursts during the response period when the AP is receiving. Thus any acknowledgment of the data burst or any sub-bursts may wait until the acknowledgment phase, when a single acknowledgment to a given STA may be used to acknowledge the data burst from that STA. One of the sub-bursts, (e.g., the final MPDU, although the scope of the invention is not limited in this manner) may specify whether any acknowledgment is requested, and if so, what type of acknowledgment.

In some embodiments, a non-immediate block acknowledgment may be requested. A block acknowledgment may acknowledge multiple sub-bursts with a single acknowledgment. A non-immediate acknowledgment may indicate that the AP will wait until after the data phase before sending the acknowledgment, even if the STA completed its transmission well before the end of the data phase. The non-immediate block acknowledgment request therefore may be a request for a single acknowledgment for the entire data burst, with the acknowledgment expected to be received at some time after the end of the data phase. In some embodiments the 'non-immediate' element may be specified in the acknowledgment request, but in other embodiments may be a required element with being specified in the acknowledgment request. In some embodiments, each STA may start a timeout period after the end of the data phase. If the expected acknowledgment is received before the end of that timeout, the STA may assume that the data burst was correctly received by the AP. If the expected acknowledgment is not received before the end of that timeout, the STA may assume that the data burst was not correctly received by the AP, and may take appropriate corrective action. In some embodiments, the corrective action may include retransmitting the data burst to the AP in response to a subsequent poll.

Figure 3:
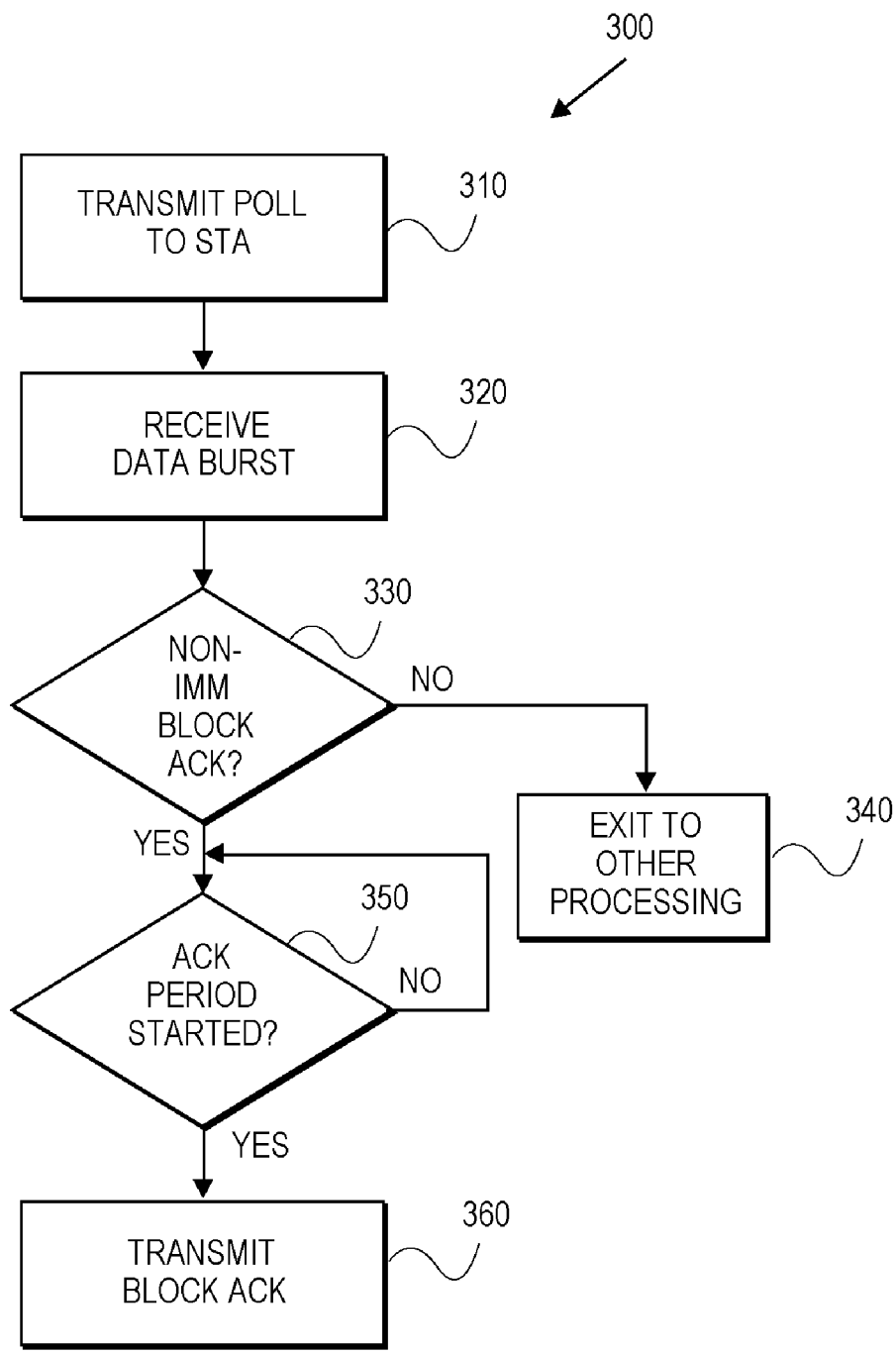
FIG. 3 shows a flow chart of a method that may be performed by a base station, according to an embodiment of the invention.

FIG. 3 shows a flow chart of a method of operation of a base station, according to an embodiment of the invention. The base station may transmit to, and/or receive from, multiple STAs substantially simultaneously by using SDMA techniques, but for simplicity only the communications between one STA and the base station are described in the flow chart. In flow chart 300, the base station may transmit a poll to a STA at 310, requesting that the STA respond by sending a data burst. The data burst transmitted by the STA in response to the poll may be received at 320. At 330, the data burst may be examined for the presence of a request for a non-immediate (specified or inherently required) block acknowledgment. If no such request is found, or if a different type of acknowledgment is requested, control may exit at 340 to other processing not shown. If a non-immediate block acknowledgment is detected, there may be a delay at 350 until the data phase ends and the acknowledgment phase starts. The end of the data phase and/or the start of the acknowledgment phase may be determined in various ways, such as a hardware timer.

In some embodiments, the protocol being used may default to a non-immediate block acknowledgment format without the use of an acknowledgment request in the data burst, so that decision block 330 automatically defaults to 'yes'. During the acknowledgment period, a block acknowledgment may be transmitted to the relevant STA at 360.

Figure 4:
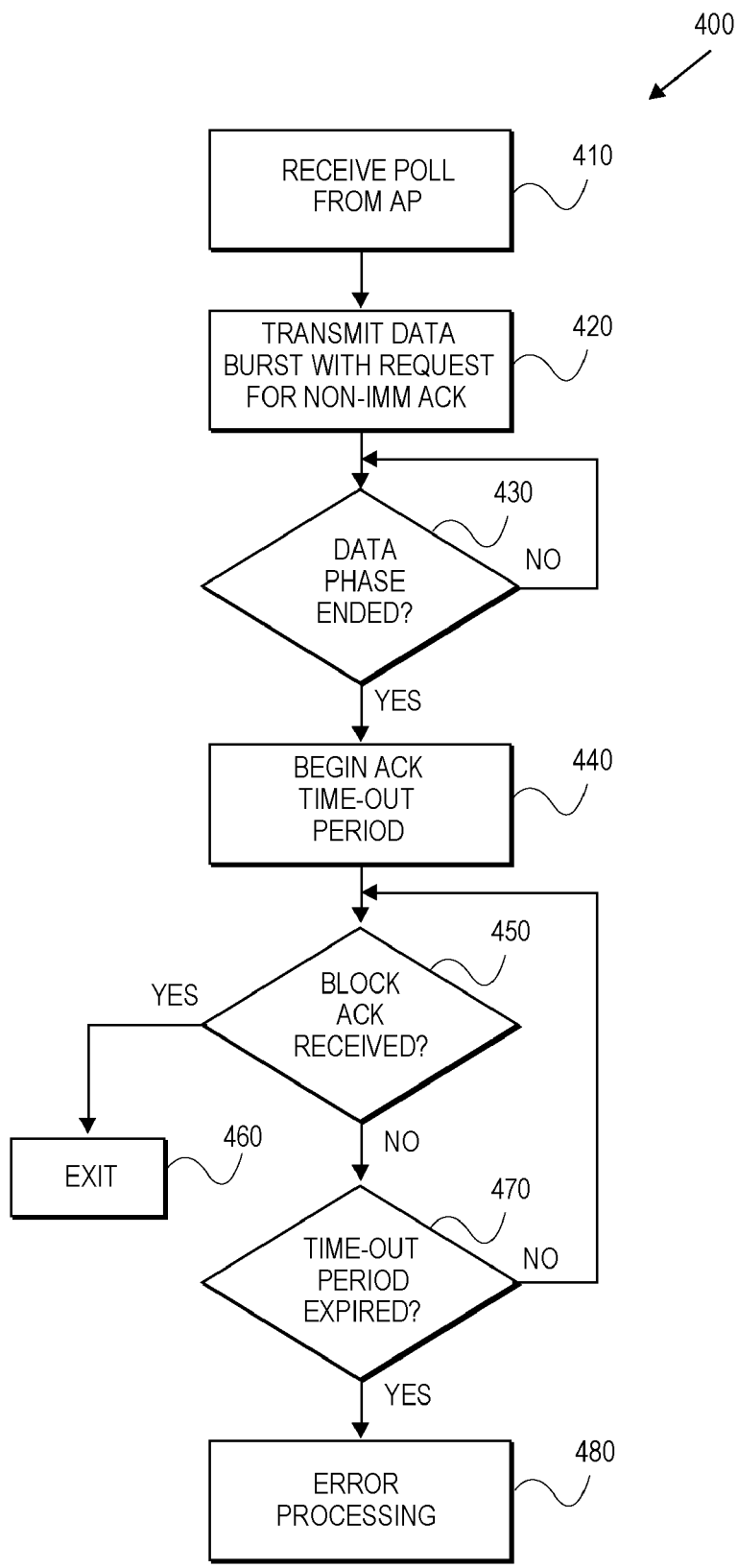
FIG. 4 shows a flow chart of a method that may be performed by a mobile device, according to an embodiment of the invention.

FIG. 4 shows a flow chart of a method of operation of a mobile device, according to an embodiment of the invention. In flow chart 400, at 410 the mobile device may receive a poll from a base station, triggering the mobile device to respond by transmitting a data burst at 420. In some embodiments the data burst may include a request for a non-immediate block acknowledgment, while in other embodiments, the protocol being used may default to a non-immediate block acknowledgment format without the use of such a request in the data burst. After completion of the data burst, the STA may wait at 430 until the end of the data period.

After the end of the data period, the STA may begin an acknowledgment timeout period at 440. In some embodiments the timeout period may be measured by a hardware timer, but other embodiments may use other techniques. If a block acknowledgment is received from the base station before the end of the timeout period as determined by the loop at 450 and 470, the timeout period may be cancelled and this processing exits at 460. However, if the block acknowledgment has not been received by the end of the timeout period, as determined by the loop at 450 and 470, control may move to some form of error processing at 480. Such error processing may include retransmitting the data burst after receiving a subsequent poll from the base station. In some embodiments blocks 440-480 may be applied to individual sub-bursts rather than to the data burst as a whole The operations described above may include processes needed to cause a computer platform to perform the operations, such as but not limited to placing data into at least one transmit queue and/or reading data from at least one receive queue.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 5:
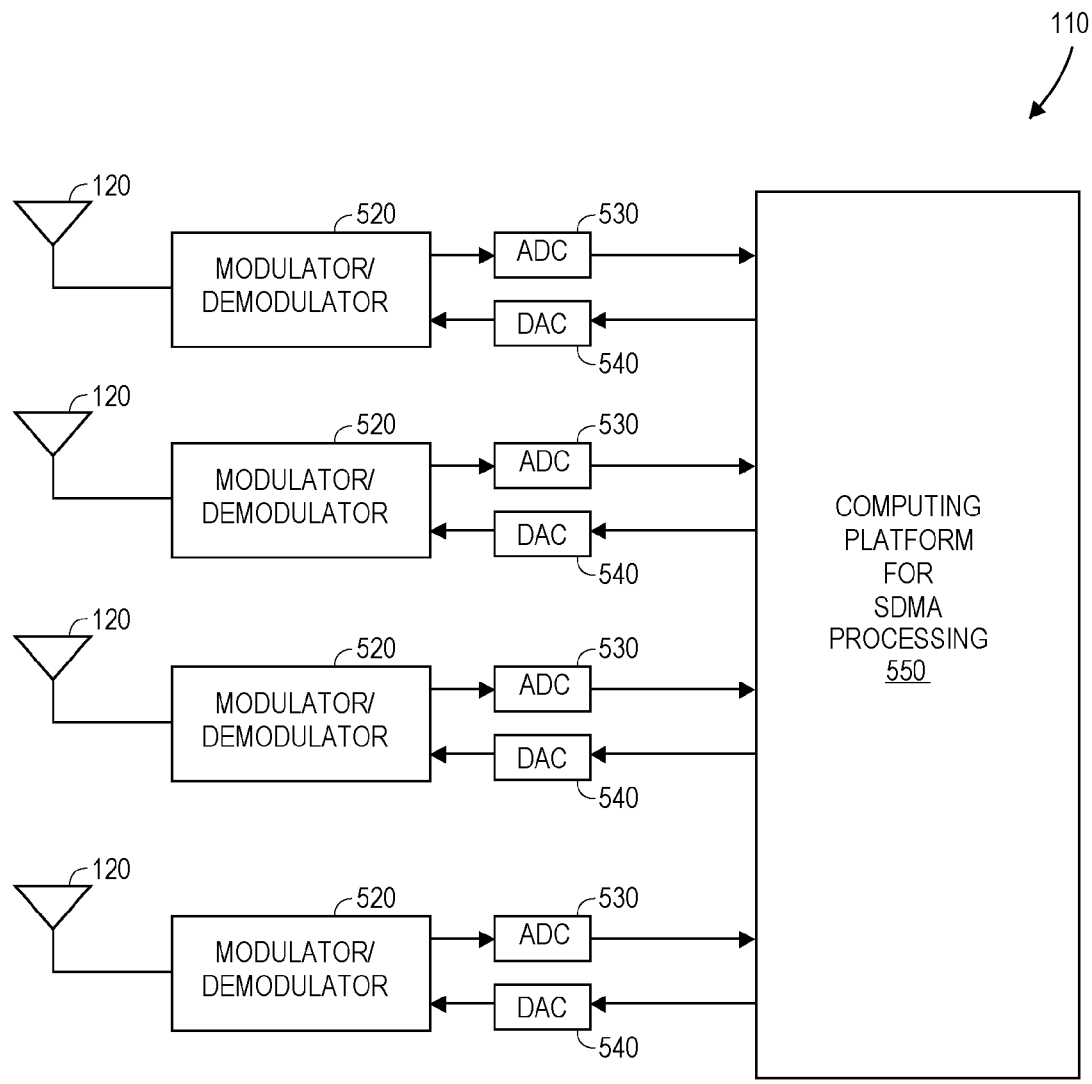
FIG. 5 shows a block diagram of a base station, according to an embodiment of the invention.

FIG. 5 shows a block diagram of a base station, according to an embodiment of the invention. Computing platform 550, which may perform processing suitable for a base station, may include one or more processors, and in some embodiments at least one of the one or more processors may be a digital signal processor (DSP). In the illustrated embodiment, AP 110 has four antennas 120, but other embodiments may have two, three, or more than four antennas. For each antenna, base station 110 may have a modulator/demodulator 520, an analog-to-digital converter (ADC) 530, and a digital-to-analog converter (DAC) 540. The combination of demodulator-ADC may convert received radio frequency signals from the antenna into digital signals suitable for processing by the computing platform 550. Similarly, the combination of DAC-modulator may convert digital signals from the computing platform 550 into radio frequency signals suitable for transmission through the antenna. Other components not shown may be included in the illustrated blocks as needed, such as but not limited to amplifiers, filters, oscillators, multiple quantities of ADCs and/or DACs where only one is shown, etc.

Figure 6:
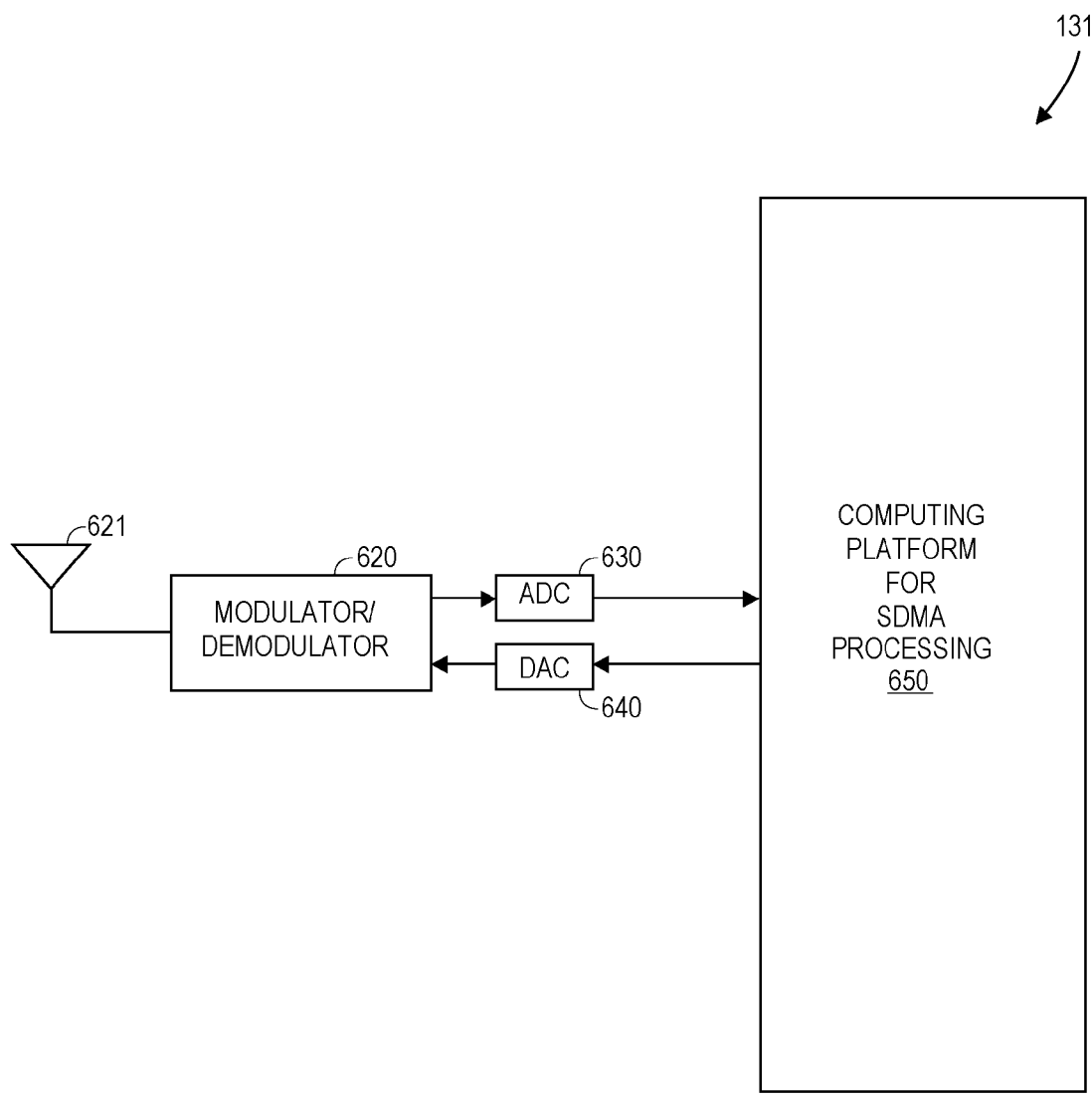
FIG. 6 shows a block diagram of a mobile device, according to an embodiment of the invention.

FIG. 6 shows a block diagram of a mobile device, according to an embodiment of the invention. The illustrated components of mobile device 131 may include a computing platform 650, antenna 621, modulator/demodulator 620, ADC 630, and DAC 640 that may be functionally similar to those similarly-named components of FIG. 5, but the device of FIG. 6 is shown with a single antenna/modulator/demodulator/ADC/DAC combination, and the computing platform 650 may perform the operations previously described for a mobile device rather than a base station, although various embodiments of the invention are not limited in these respects.

Figure 7:
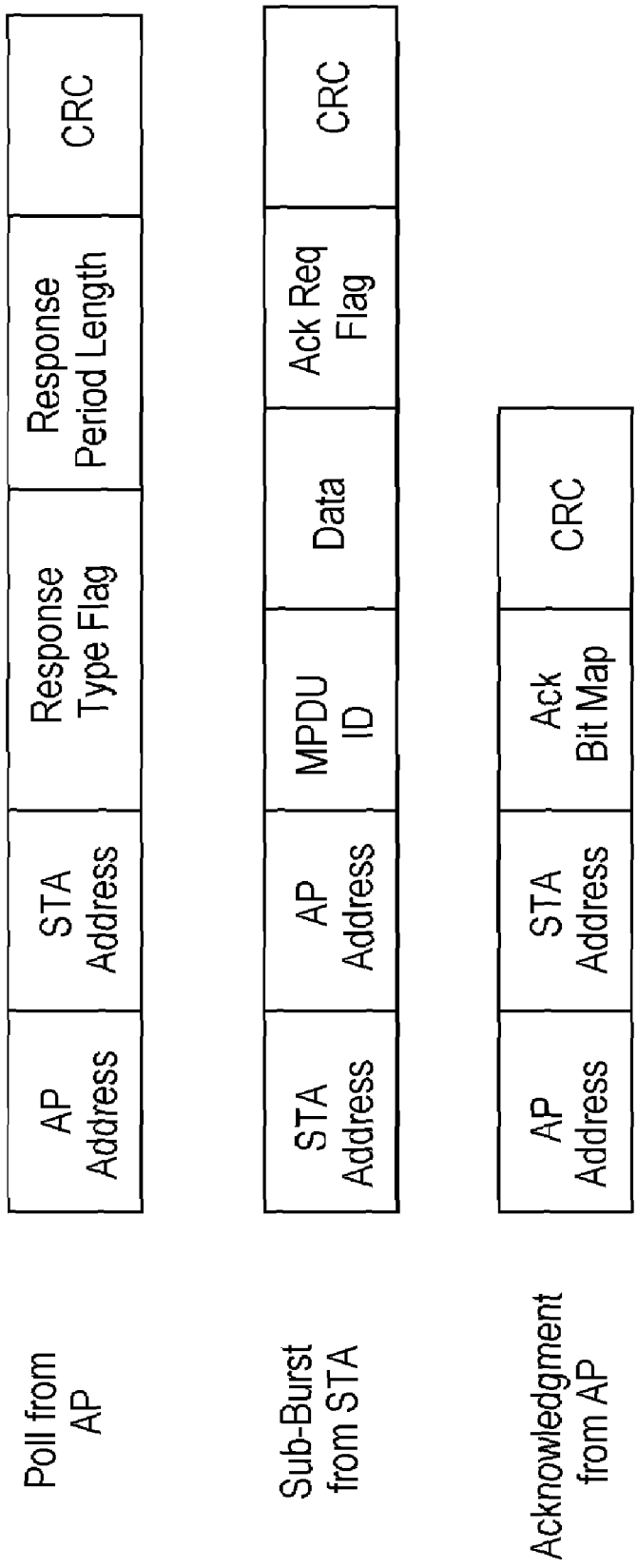
FIG. 7 shows communications formats that may be used in a communications sequence, according to an embodiment of the invention.

FIG. 7 shows some communications formats that may be used in particular embodiments of the invention, although other embodiments are not limited in this respect. Various embodiments may include some, all, or none of the illustrated elements of FIG. 7, and the order the elements may be different from that shown. Headers, trailers, and other elements needed to establish the start and end of a communications block are not shown. In the embodiment of FIG. 7:

1) All: Each transmission in the communications sequence may contain the address of the transmitting device and the address of the intended recipient. Because other APs and STAs may be within range, including these addresses may prevent confusion within the network.

2) Poll from AP: In addition to the aforementioned addresses, the poll may comprise a Response Type Flag indicating the type of response that is requested from the STAs (e.g., the STAs will wait until a predefined response period before responding, the response period beginning a pre-defined time period after the end of the poll). The poll may also comprise a Response Period Length (e.g., the response period lasts for the indicated length of time, and the STA must complete its response within that time period). Finally, the block may end with a validity check character to assure the block was received correctly (e.g., a cyclic redundancy check (CRC) character).

3) Sub-burst from STA: During the response period, the STA may respond with a data burst containing a series of multiple sub-bursts. In addition to the aforementioned addresses, each sub-burst may contain an identifier that uniquely identifies this particular sub-burst within the data burst (e.g., an MPDU ID number). After the data portion, the block may contain an acknowledgment request flag that indicates whether an acknowledgment is expected, and if so, what type of acknowledgment. For all but the last sub-burst, a 'no acknowledgment' flag may be used, indicating no acknowledgment is requested for these individual sub-bursts. For the last sub-burst, a block acknowledgment request may be indicated, indicating that a block acknowledgment is expected for the data burst as a whole. The request may specify a non-immediate block acknowledgment (i.e., an acknowledgment timeout period does not automatically begin immediately after the sub-burst containing the request). Alternatively, the non-immediate element may be an understood requirement that is built into the block acknowledgment format, so that the block acknowledgment is not expected until after the response period is over even though the request does not specify 'non-immediate'.

4) Acknowledgment from AP: In addition to the aforementioned addresses, the block acknowledgment from the AP may contain an acknowledgment bit map, with a separate bit in the bit map associated with each sub-burst. Each bit in the bit map may be asserted (e.g., a logic '1') if the associated sub-burst was correctly received by the AP, or may be de-asserted (e.g., a logic '0') if the associated sub-burst was not correctly received by the AP. Incorrect receipt may include, but is not limited to, such things as: a) the associated sub-burst was not received, b) the associated sub-burst failed a CRC check, c) the associated sub-burst had an incorrect format or was of an incorrect type, d) etc. In one embodiment the bit map contains a pre-defined number of bits to accommodate the maximum allowed number of sub-bursts, but other embodiments may use other arrangements (e.g., the bit map may contain only as many bits as the data burst contained sub-bursts, the bit map may be sized and organized according to how the sub-bursts are identified, etc.) Finally, the acknowledgement block may contain a CRC character so that the STA may verify the acknowledgement block was correctly received.

The foregoing description is intended to be illustrative and not limiting. Variations may occur to those of skill in the art. Those variations are intended to be included in the various embodiments of the invention, which are limited only by the spirit and scope of the appended claims.

What is claimed is:

1. An apparatus, comprising
    a first electronic device adapted to:
        transmit polls to multiple second electronic devices substantially simultaneously on a same frequency using spatial division multiple access techniques;
        receive a data burst from a particular one of the multiple second electronic devices during a data phase subsequent to said transmitting the polls, substantially simultaneously with receiving other data bursts from others of the multiple second electronic devices; and
        transmit a block acknowledgment to the particular second electronic device after the data phase using spatial division multiple access techniques.

2. The apparatus of claim 1, wherein the first electronic device is further adapted to receive a block acknowledgment request within the data burst.

3. The apparatus of claim I, wherein the first electronic device is further adapted to transmit an indicator of a length of the data phase within at least one of the polls.

4. The apparatus of claim 1, wherein the first electronic device is further adapted to:
    receive multiple sub-bursts within the data burst from the particular one of the multiple second electronic devices; and
    transmit individual acknowledgments within the block acknowledgment for individual ones of the sub-bursts.

5. The apparatus of claim 1, wherein the first electronic device comprises:
    a computing platform; and
    at least four modulator/demodulators coupled to the computing platform.

6. The apparatus of claim 5, wherein the first electronic device further comprises
    at least four antennas, each antenna coupled to at least one of the modulator/demodulators.

7. A method, comprising:
    transmitting a first poll to a first electronic device and a second poll to a second electronic device substantially simultaneously on a same frequency using spatial division multiple access techniques;
    receiving a first data burst from the first electronic device and a second data burst from the second electronic device substantially simultaneously on the same frequency subsequent to said transmitting;
    detecting a non-immediate block acknowledgment request in at least one of the first and second data bursts; and
    transmitting a first block acknowledgment to the first electronic device and a second block acknowledgment to the second electronic device substantially simultaneously on the same frequency using spatial division multiple access techniques, subsequent to said receiving.

8. The method of claim 7, wherein said receiving the first data burst comprises receiving multiple sub-bursts within the first data burst.

9. The method of claim 8, wherein said transmitting comprises transmitting individual acknowledgments for individual ones of the multiple sub-bursts.

10. A machine-readable medium that provides instructions, which when executed by a computing platform, cause said processing platform to perform operations comprising:
   placing into at least one transmit queue polls to multiple electronic devices;
   receiving data from the multiple electronic devices in at least one receive queue;
   detecting a block acknowledgment request in the received data from at least one of the multiple electronic devices;
   waiting until a predefined time period is ended; and
   placing into the at least one transmit queue a block acknowledgment to the at least one of the multiple electronic devices.

11. The medium of claim 10, wherein the operation of receiving data includes receiving data from multiple medium access control protocol data units.

12. The medium of claim 10, wherein the operation of placing a block acknowledgment comprises placing multiple indicators in the block acknowledgment to acknowledge multiple correctly received portions of the received data.

13. The medium of claim 10, wherein the operations further comprise using spatial division multiple access techniques to transmit the block acknowledgment.

* * * * *